United States Patent
Volkens et al.

(10) Patent No.: US 11,041,571 B2
(45) Date of Patent: Jun. 22, 2021

(54) RETENTION MECHANISM FOR NOISE ATTENUATION DOME IN FLUID FLOW CONTROL DEVICE

(71) Applicant: FISHER CONTROLS INTERNATIONAL LLC, Marshalltown, IA (US)

(72) Inventors: Evan M. Volkens, Marshalltown, IA (US); Zachary M. Scheuffele, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 105 days.

(21) Appl. No.: 16/213,690

(22) Filed: Dec. 7, 2018

(65) Prior Publication Data

US 2020/0182378 A1 Jun. 11, 2020

(51) Int. Cl.
*F16K 5/06* (2006.01)
*F16K 47/14* (2006.01)
(Continued)

(52) U.S. Cl.
CPC .............. *F16K 5/0605* (2013.01); *F16K 47/14* (2013.01); *F16K 27/067* (2013.01); *F16K 47/045* (2013.01)

(58) Field of Classification Search
CPC ........ F16K 47/08; F16K 47/14; F16K 5/0631; F16K 5/0642; F16K 5/0668; F16K 5/0673; F16K 5/0678; F16K 5/0689; F16K 5/12; F16K 5/201; F16K 27/067; Y10T 137/0508
See application file for complete search history.

(56) References Cited

U.S. PATENT DOCUMENTS

| 4,271,866 A | 6/1981 | Bey |
| 5,480,123 A * | 1/1996 | Bey .......................... F16K 1/22 251/127 |

(Continued)

FOREIGN PATENT DOCUMENTS

| EP | 0763680 A1 | 3/1997 |
| EP | 2751454 A1 | 7/2014 |

(Continued)

OTHER PUBLICATIONS

International Search Report and Written Opinion, corresponding International Application No. PCT/US2019/064354, dated Mar. 5, 2020.

*Primary Examiner* — Hailey K. Do
(74) *Attorney, Agent, or Firm* — Marshall, Gerstein & Borun LLP

(57) ABSTRACT

A fluid flow control device includes a valve body defining an inlet, an outlet, and a fluid flow path extending therebetween, a rotatable valve member at least partially disposed in the valve body, an attenuator operably coupled to the valve body, and a retention member disposed within the valve body. The rotatable valve member is rotatable within the fluid flow path from a shut-off position to an open position for controlling the flow of fluid through the fluid flow path. The attenuator defines an attenuator body that includes a plurality of noise-reducing apertures. The retention member is positioned against a portion of the attenuator body to retain the attenuator within the valve body.

17 Claims, 3 Drawing Sheets

(51) Int. Cl.
*F16K 27/06* (2006.01)
*F16K 47/04* (2006.01)

(56) References Cited

U.S. PATENT DOCUMENTS

| | | | | |
|---|---|---|---|---|
| 5,482,249 | A | * | 1/1996 | Schafbuch .............. F16K 47/08 |
| | | | | 251/118 |
| 5,988,586 | A | * | 11/1999 | Boger .................... F16K 47/08 |
| | | | | 138/42 |
| 2008/0169441 | A1 | * | 7/2008 | Beebe ................... F16K 5/0642 |
| | | | | 251/248 |
| 2010/0258193 | A1 | * | 10/2010 | Christenson .......... F16K 5/0605 |
| | | | | 137/1 |
| 2011/0062366 | A1 | * | 3/2011 | Thomas ................ F16K 27/067 |
| | | | | 251/315.01 |
| 2014/0175319 | A1 | * | 6/2014 | Bell ...................... F16K 27/067 |
| | | | | 251/367 |
| 2018/0245713 | A1 | | 8/2018 | Eilers et al. |

FOREIGN PATENT DOCUMENTS

| | | |
|---|---|---|
| RU | 2615239 C1 | 4/2017 |
| WO | WO-2013/066245 A1 | 5/2013 |
| WO | WO-2017/039516 A1 | 3/2017 |
| WO | WO-2017039516 A1 * 3/2017 | ........... F16K 27/067 |

\* cited by examiner

US 11,041,571 B2

RETENTION MECHANISM FOR NOISE ATTENUATION DOME IN FLUID FLOW CONTROL DEVICE

FIELD OF THE DISCLOSURE

The present disclosure generally relates to fluid flow control devices and, more particularly, to a retention mechanism that retains a noise attenuation dome in a rotary ball valve.

BACKGROUND

Valves are commonly used in process control systems to control the flow of process fluids. Rotary ball valves typically have a rotatable closure member (e.g., a ball) rotatably disposed in a fluid path. A shaft operatively couples the closure member to an actuation device to rotate the closure member between an open position and a closed position, thereby selectively allowing or restricting fluid flow between an inlet and an outlet of the valve. The valve may use any number of noise attenuation domes having varying configurations in order to assist in reducing aerodynamic and hydrodynamic noise within the system.

These noise attenuation domes must be properly secured within the valve to ensure proper operation thereof. In some systems, components such as a dome spacer, O-rings, fasteners, and other components may be used to secure the attenuation dome within the valve and to provide proper sealing therewith. These components can be highly complex and can require costly manufacturing processes. Further, due to the number of possible valve applications, these systems oftentimes require custom components for each valve application. For example, some rotary ball valve designs may use multiple valve tail piece designs for each valve size and/or pressure class that differ depending on whether: a) only sealing is desired in the particular application; b) only attenuation is desired in the particular application; and/or c) both sealing and attenuation is desired in the particular application. Additionally, different attenuation domes may be needed for each valve size and configuration. Accordingly, current systems have a substantial number of possible combinations and can require a large number of different components to be produced and stored by manufacturers.

SUMMARY

In accordance with one exemplary aspect, a fluid flow control device includes a valve body defining an inlet, an outlet, and a fluid flow path extending therebetween, a rotatable valve member at least partially disposed in the valve body, an attenuator operably coupled to the valve body, and a retention member disposed within the valve body. The rotatable valve member is rotatable within the fluid flow path from a shut-off position to an open position for controlling the flow of fluid through the fluid flow path. The attenuator defines an attenuator body that includes a plurality of noise-reducing apertures. The retention member is positioned against a portion of the attenuator body to retain the attenuator within the valve body. In some forms, the retention member is constructed from a metallic material.

In some forms, the attenuator body defines a retention flange. The retention member is configured to abut the retention flange to retain the attenuator within the valve body. The valve body may further define a retention member groove to accommodate a portion of the retention member.

In some examples, the retention member may be frictionally fit within the retention member groove by way of stored energy in the deformed retention member. In some forms, the retention flange includes a bore to accommodate a pin that secures the attenuator to the valve body. The rotatable valve member may rotate relative to the attenuator.

In some examples, the fluid flow control device may further include a floating ball seal carrier that is at least partially disposed within the valve body. The ball seal carrier exerts a sealing force on the rotatable valve member. A sealing element may be disposed within a groove formed on a portion of the ball seal carrier such that the ball seal carrier sealingly engages the valve body.

In accordance with another exemplary aspect, a method of assembling a fluid flow control device having a valve body defining an inlet, an outlet, and a fluid flow path extending from the inlet to the outlet includes disposing an attenuator within the valve body, positioning a portion of the retention member against a portion of the attenuator, and disposing a rotatable valve member within the valve body. The attenuator defines an attenuator body including a plurality of noise-reducing apertures. The retention member is positioned in the valve body and against the attenuator to retain the attenuator within the valve body.

BRIEF DESCRIPTION OF THE DRAWINGS

The above needs are at least partially met through provision of the fluid flow control device having a particle catcher described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a fluid flow control device having a retention mechanism for a noise attenuation dome is provided. The retention mechanism is adapted to engage the attenuation dome to secure the dome within the valve member and, in some configurations, is constructed from a bent strip of steel or other metallic material. Accordingly, the retention mechanism and related components provide a low-cost approach to component retention that is easy to manufacture and can be prepared within minimal lead times.

Figure 1:
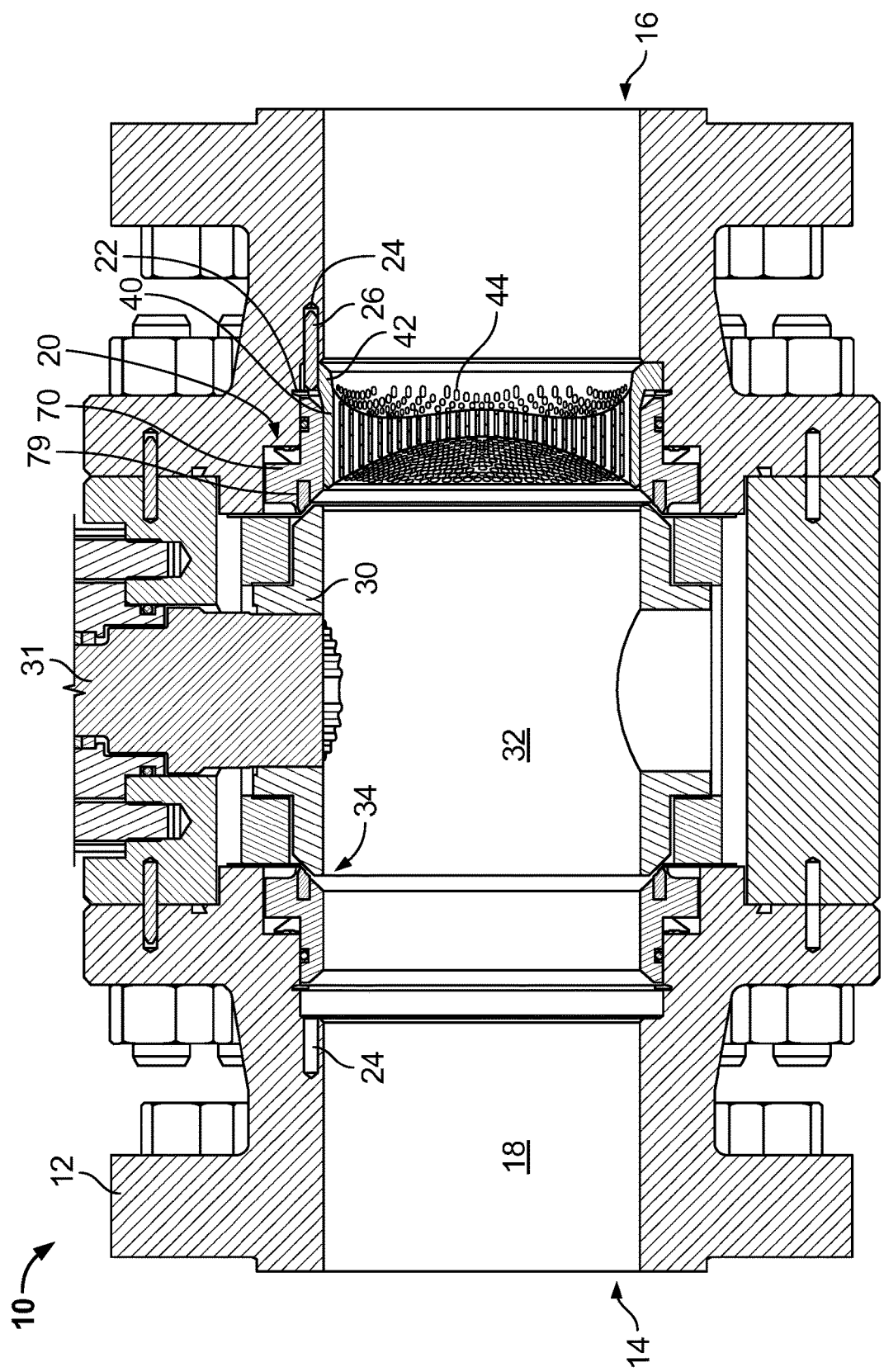
FIG. 1 illustrates a cross-sectional view of an example fluid flow control device having a retention mechanism for a noise attenuation dome in accordance with various embodiments.
Figure 2:
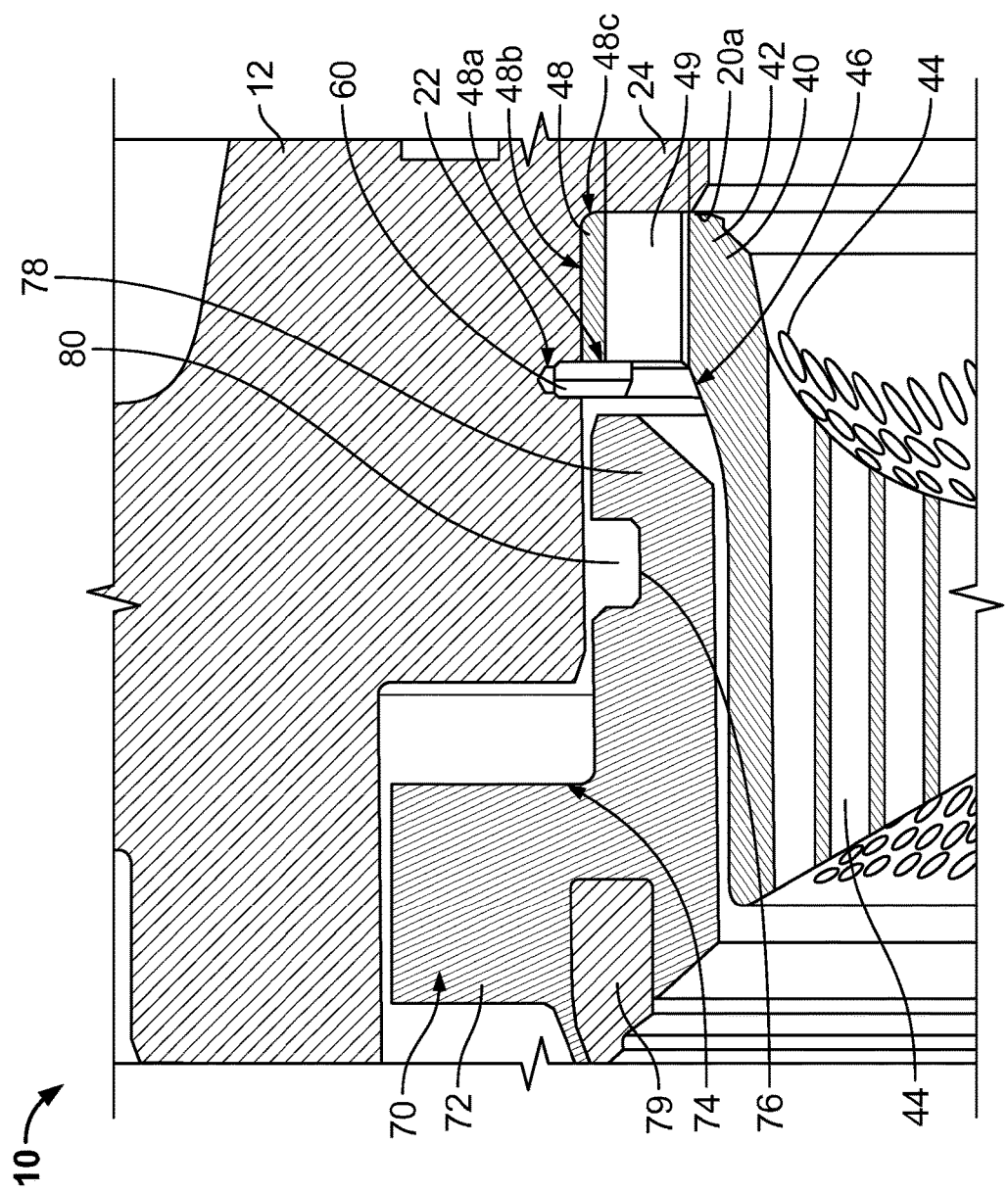
FIG. 2 illustrates a first enlarged cross-sectional view of the example fluid flow control device of FIG. 1 in accordance with various embodiments.
Figure 3:
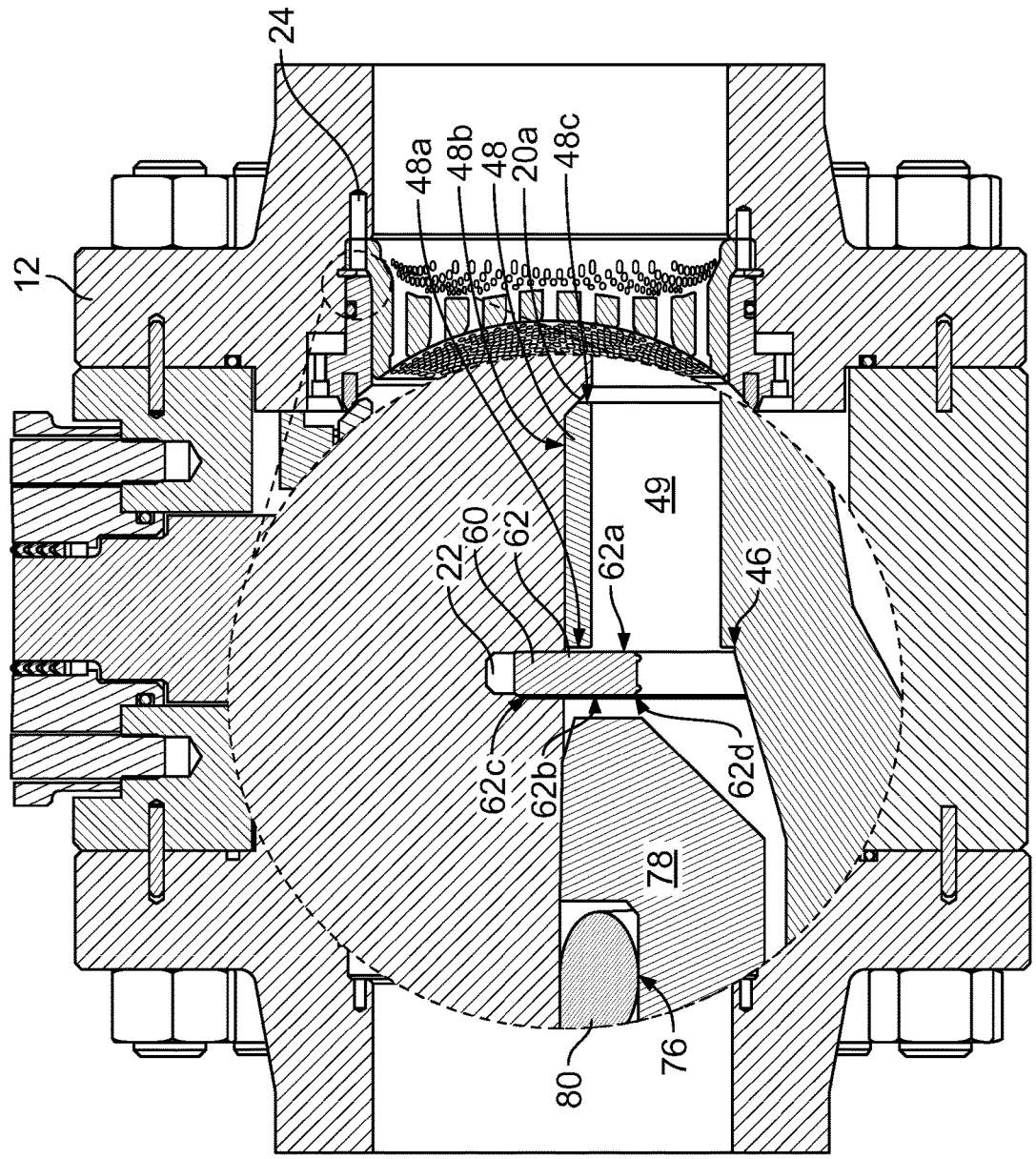
FIG. 3 illustrates a second enlarged cross-sectional view of the example fluid flow control device of FIGS. 1 and 2 in accordance with various embodiments.

An example fluid flow control device having a retention mechanism for a noise attenuation dome is shown in FIGS. 1-3. The example valve is a rotary ball fluid control valve 10 that includes a valve tailpiece or body 12 defining an inlet port 14, an outlet port 16, and a fluid flow path 18 extending from the inlet port 14 to the outlet port 16, a rotatable valve member in the form of a rotary ball 30, an attenuator 40, and a retention member 60. The valve body 12 further defines a stepped cavity section 20 that forms a groove 22 and a pin bore 24. The valve 10 may include any number of additional components to assist in its operation such as, for example, sealing assemblies, lubricants, clamping and/or fastening mechanisms, and the like.

The rotary ball 30 is at least partially disposed within the valve body 12 and is rotatable within the fluid flow path 18 via a shaft 31 operably coupled thereto. The shaft 31 is additionally coupled to an actuator (not shown) that provides an actuating force to selectively rotate the rotary ball 30.

The rotary ball 30 is rotatable between a fluid closed (e.g., a shut off) position and an open position with respect to a valve seat within the valve body 12 to control the flow of fluid through the fluid flow path 18. In the illustrated example, the rotary ball 30 is a spherically shaped ball defining a solid, spherical surface 32 and a bore 34 for allowing fluid to pass therethrough when the solid surface 32 is not seated against the valve seat. In other words, in this configuration, the port 34 is in fluid communication with the fluid flow path 18. When the spherical surface 32 of the rotary ball 30 is seated against the valve seat, fluid is shut off between the inlet port 14 and the outlet port 16.

As previously noted, the fluid control valve 10 includes at least one noise attenuation dome or attenuator 40 provided for attenuating the aerodynamic and hydrodynamic noise in the valve environment. The attenuator 40 defines an attenuator body 42 that is dome-shaped and includes a plurality of apertures 44 forming fluid passageways through the body 42. While the illustrated valve 10 depicts a single attenuator 40, it is understood that the valve 10 may include multiple (e.g., two) attenuators positioned around a perimeter of the rotary ball 30.

The attenuator body 42 further defines a perimeter 46 with an outer profile in stepped fashion that corresponds with the stepped cavity section 20 of the valve body 12. Specifically, as illustrated in FIGS. 2 and 3, the perimeter 46 forms a flange 48 having a first surface 48*a*, a second surface 48*b*, and a third surface 48*c*. The flange 48 further defines a bore 49 that extends between the first surface 48*a* and the third surface 48*c*.

The retention member 60 is in the form of a thin metal ring defining a retention member body 62 having a first surface 62*a*, a second surface 62*b*, a first end 62*c*, and a second end 62*d*. Generally, when installed within the valve 10, the retention member 60 abuts against the attenuator 40 to lock or retain the attenuator 40 within a designated volume of the valve body 12. More specifically, as illustrated in FIGS. 2 and 3, the first end 62*c* of the retention member body 62 is at least partially disposed within the groove 22 of the valve body 12, while the second end 62*d* of the retention member body 62 extends inwardly from the valve body 12. In some forms, the retention member 60 may be frictionally fit within the groove 22. In other forms, the retention member 60 may be secured within the groove 22 via any number of approaches such as, for example, a threaded connection, adhesives, through the use of fasteners, and the like. The first surface 62*a* of the retention member body 62 contacts the first surface 48*a* of the flange 48 and acts as a stop to maintain the attenuator 40. Notably, the stepped cavity section 20 of the valve body 12 additionally includes a ledge 20*a* that the third surface 48*c* of the flange 48 abuts against to further limit movement of the flange 48 (and thus the attenuator 40).

In some examples, it may be desired to secure the attenuator 40 to the valve body 12 such that relative rotation therebetween is restricted and the relative translation along the shaft 31 axis is fixed. Accordingly, a pin 26 (FIG. 1) may be inserted through the bore 49 formed by the flange 48 of the attenuator and into the pin bore 24 of the valve body 12. As a result, the attenuator 40 remains in a fixed position relative to the rotary ball 30. Any number of additional securement mechanisms may be used.

In some valve applications, sealing capability may be desired. Accordingly, a floating ball seal carrier 70 is provided. The floating ball seal carrier 70 defines a seal carrier body 72 that, like the perimeter 46 of the attenuator body 42, has a perimeter 74 that is in a stepped configuration to correspond to the stepped cavity section 20 of the valve body 12. Additionally, the seal carrier body 72 includes a groove 76 and a stop region 78. The groove 76 accommodates a sealing member (e.g., an O-ring) 80 to create a seal between the seal carrier 70 and the valve body 12.

The seal carrier 70 is movable (i.e., floating) within the valve body 12. In some forms, the stop region 78 is configured to abut against the second surface 62*b* of the retention member body 62 to restrict movement of the seal carrier 70 in a first direction, and is configured to abut against the rotary ball 30 to restrict movement of the seal carrier in a second direction. Further, in some configurations, a resilient member (e.g., a spring; not shown) is configured to exert a force against the seal carrier body 72 that urges a seal insert 79 via the seal carrier body 72 against a portion of the rotary ball 30. In one example, the seal insert 79 and the sealing member 80 create a pressure unbalanced area that fluid pressure acts against, thereby creating a resultant pressure unbalanced force that is exerted on the seal insert 79 and onto the rotary ball 30. In any event, the sealing member 80 remains in contact with the valve body 12 throughout travel limits of the floating ball seal carrier 70.

In some forms, the valve 10 is assembled by disposing the attenuator 40 within the valve body 12. In some examples, the pin 26 may first be inserted into the pin bore 24 and/or the bore 49 of the flange 48 to assist in properly aligning the attenuator 40 relative to the valve body 12. A portion of the retention member 60 (i.e., the first end 62*a*) is positioned against a portion of the attenuator flange 48 to retain the attenuator 40 within the valve body 12. The rotary ball 30 is then disposed within the valve body 12, and any additional components such as the shaft 31 may be coupled thereto.

So configured, the valve 10 uses fewer components that are easy to manufacture and assemble. The retention member 60 has a prolonged useful life and may only require servicing upon major inspection of the valve 10. Additionally, the provided valve 10 uses a singular tailpiece design for all possible constructions in a given size and/or pressure classification. Further, by reducing complexity of the valve, fewer attenuator and seal carrier designs are required for a given size and/or pressure classification. Specifically, only a single sized ball seal carrier is needed due to the ability for it to float within the different tailpiece geometries. The use of the retention member 60 also results in a reduced number of potential leak paths in the valve 10.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A fluid flow control device comprising:
    a valve body defining an inlet, an outlet, a fluid flow path extending from the inlet to the outlet, and a stepped cavity section defining a first surface extending in a direction generally parallel to the fluid flow path, the stepped cavity section including a groove extending into the first surface in a direction generally perpendicular thereto, the groove defining a first and a second opposing surface and a gap therebetween;
    a rotatable valve member at least partially disposed in the valve body and being rotatable within the fluid flow path from a shut-off position to an open position for controlling the flow of fluid through the fluid flow path;
    an attenuator operably coupled to the valve body, the attenuator defining an attenuator body including a plurality of noise-reducing apertures; and
    a retention member comprising a ring having a first surface and a second surface, the retention member being at least partially disposed between the first and the second opposing surfaces of the groove of the valve body such that the first surface of the ring is positioned adjacent to the first opposing surface of the groove and the second surface of the ring is positioned adjacent to the second opposing surface of the groove;
    wherein the retention member is positioned against a portion of the attenuator body to retain the attenuator within the valve body and to prevent the attenuator from moving inwardly toward the rotatable valve member.

2. The fluid flow control device of claim 1, wherein the retention member is constructed from a metallic material.

3. The fluid flow control device of claim 1, wherein the groove is open to the fluid flow path.

4. The fluid flow control device of claim 1, further comprising a floating ball seal carrier at least partially disposed within the valve body, the ball seal carrier adapted to exert a sealing force on the rotatable valve member.

5. The fluid flow control device of claim 4, further comprising a sealing element disposed within a groove formed on a portion of the ball seal carrier such that the ball seal carrier sealingly engages the valve body.

6. The fluid flow control device of claim 1, wherein the attenuator body defines a retention flange, wherein the retention member is configured to abut the retention flange to retain the attenuator within the valve body.

7. The fluid flow control device of claim 6, wherein the valve body further defines a retention member groove to accommodate a portion of the retention member.

8. The fluid flow control device of claim 7, wherein the retention member is frictionally fit within the retention member groove.

9. The fluid flow control device of claim 6, wherein the retention flange includes a bore to accommodate a pin that secures the attenuator to the valve body.

10. The fluid flow control device of claim 9, wherein the rotatable valve member rotates relative to the attenuator.

11. A method of assembling a fluid flow control device having a valve body defining an inlet, an outlet, a fluid flow path extending from the inlet to the outlet, and a stepped cavity section defining a first surface extending in a direction generally parallel to the fluid flow path, the stepped cavity section including a groove extending into the first surface in a direction generally perpendicular thereto, the groove defining a first and a second opposing surface and a gap therebetween, the method comprising:
    disposing an attenuator within the valve body, the attenuator defining an attenuator body including a plurality of noise-reducing apertures;
    positioning a portion of a retention member comprising a ring having a first surface and a second surface at least partially between the first and the second opposing surfaces of the groove of the valve body and against a portion of the attenuator to retain the attenuator within the valve body and to prevent the attenuator from moving inwardly into the valve body such that the first surface of the ring is positioned adjacent to the first opposing surface of the groove and the second surface of the ring is positioned adjacent to the second opposing surface of the groove; and
    disposing a rotatable valve member within the valve body.

12. The method of claim 11, further comprising positioning a floating ball seal carrier within the valve body such that the ball seal carrier exerts a sealing force on the rotatable valve member.

13. The method of claim 12, further comprising disposing a sealing element within a groove formed on a portion of the ball seal carrier such that the ball seal carrier sealingly engages the valve body.

14. The method of claim 11, wherein the retention member is positioned against a retention flange of the attenuator body such that the retention member abuts the retention flange to retain the attenuator within the valve body.

15. The method of claim 14, further comprising securing the attenuator to the valve body via a pin disposed in a bore formed in the retention flange of the retention member.

16. The method of claim 14, further comprising at least partially disposing the retention member within a retention member groove formed within the valve body.

17. The method of claim 16, further comprising frictionally fitting the retention member within the retention member groove.

* * * * *

UNITED STATES PATENT AND TRADEMARK OFFICE
CERTIFICATE OF CORRECTION

| | | |
|---|---|---|
| PATENT NO. | : 11,041,571 B2 | |
| APPLICATION NO. | : 16/213690 | |
| DATED | : June 22, 2021 | |
| INVENTOR(S) | : Evan M. Volkens et al. | |

It is certified that error appears in the above-identified patent and that said Letters Patent is hereby corrected as shown below:

In the Specification

At Column 3, Line 30, "bore 34" should be -- port 34 --.

At Column 4, Line 52, "first end 62a)" should be -- first end 62c) --.

Signed and Sealed this
Twenty-fourth Day of September, 2024

Katherine Kelly Vidal
*Director of the United States Patent and Trademark Office*